Feb. 10, 1948. C. J. RICE ET AL 2,435,798
AIR CONDITIONING UNIT
Filed Sept. 10, 1947 3 Sheets-Sheet 1
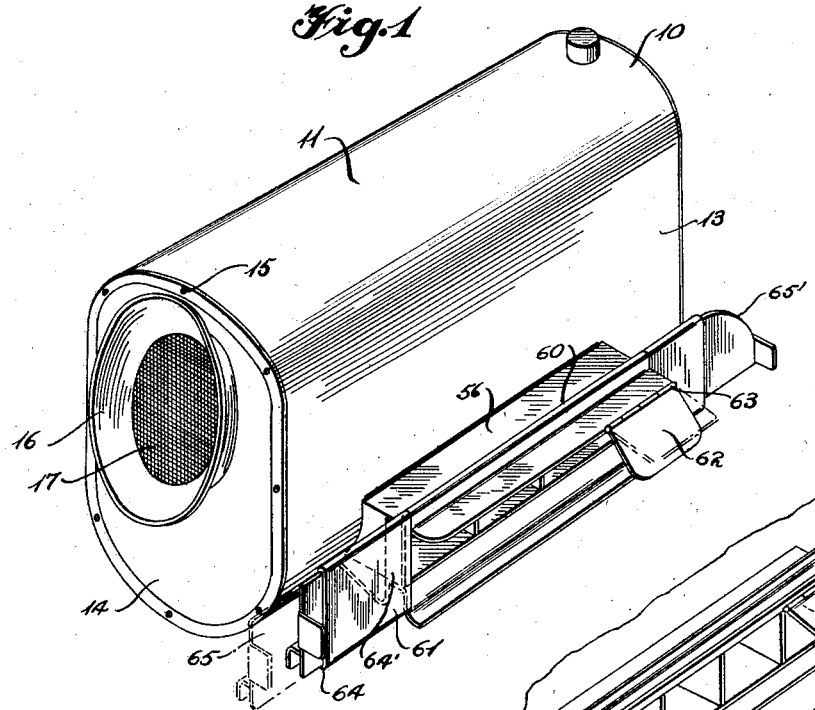
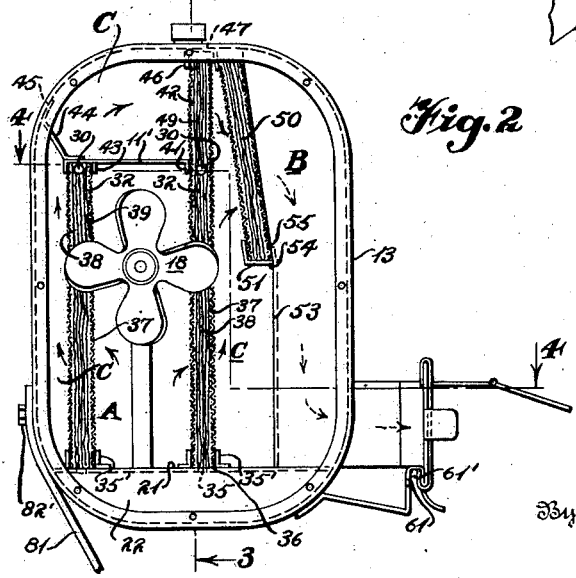
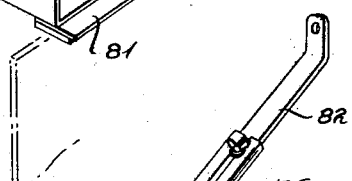
Inventor
Chester J. Rice and
Jessie V. Narrell
By Cushman, Darby & Cushman
Attorneys Feb. 10, 1948.  C. J. RICE ET AL  2,435,798
AIR CONDITIONING UNIT
Filed Sept. 10, 1947   3 Sheets-Sheet 2
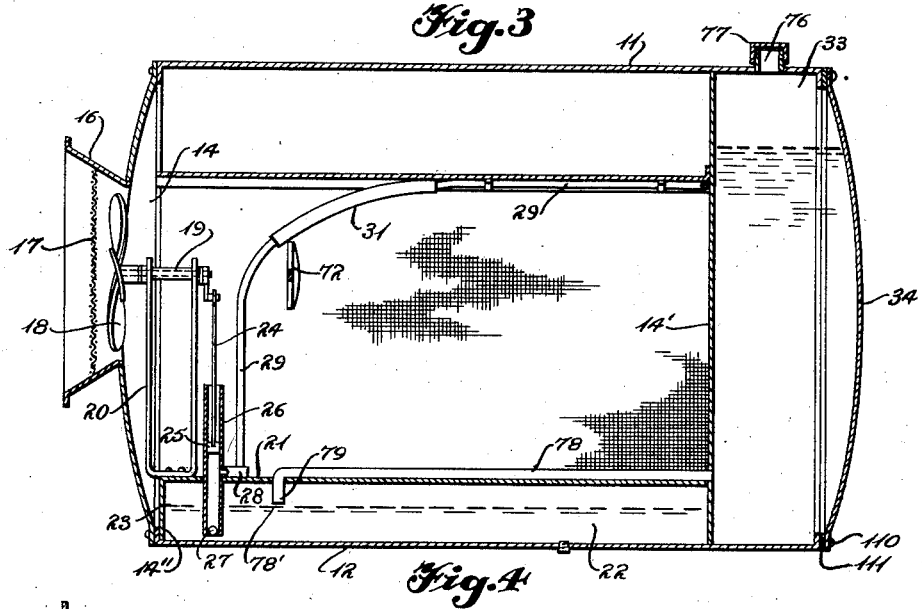
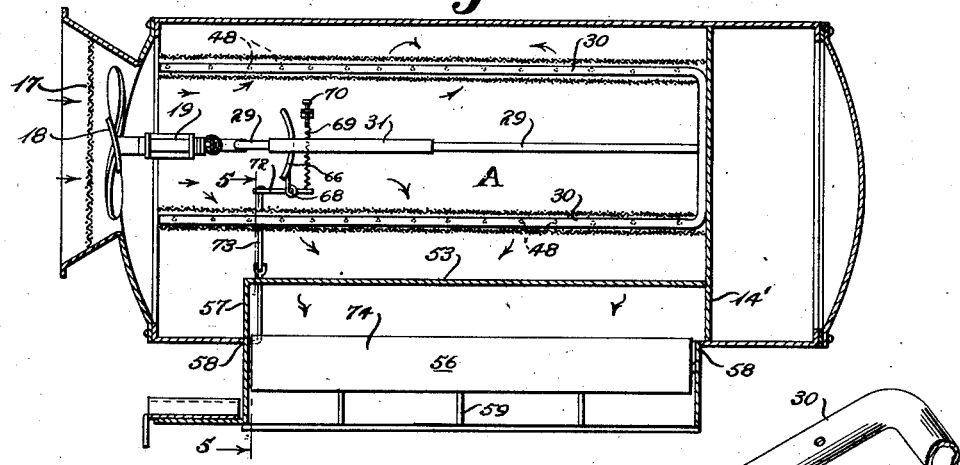
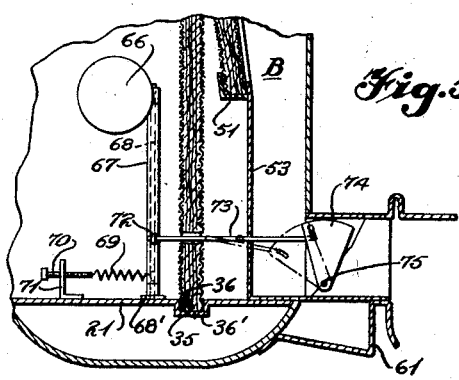
Inventor
Chester J. Rice and
Jessie V. Narrell
By Cushman, Darby & Cushman
Attorneys

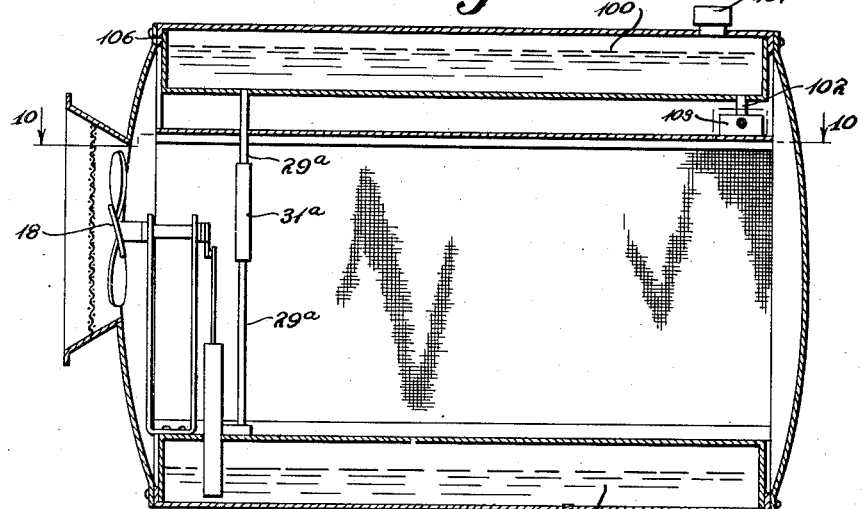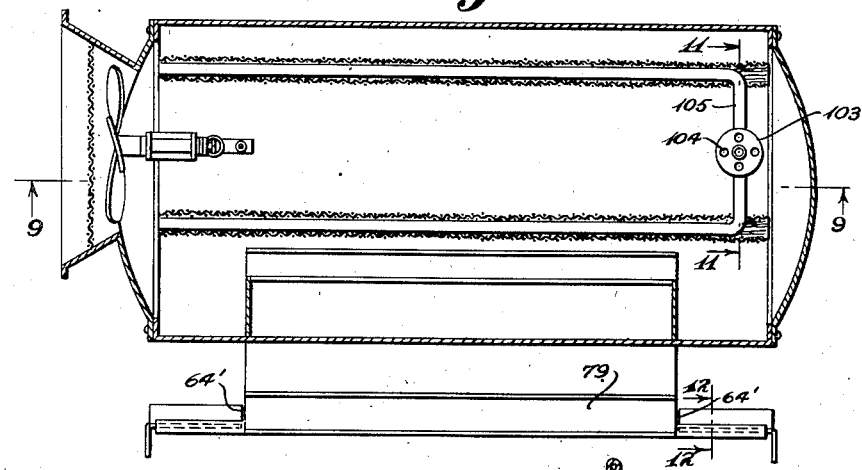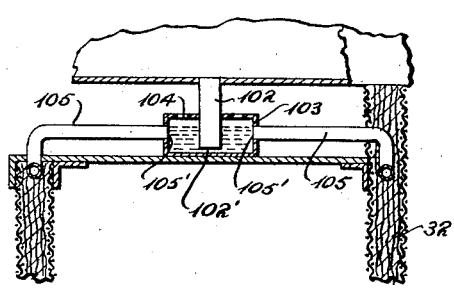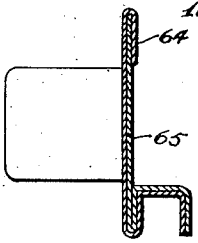

Patented Feb. 10, 1948

2,435,798

UNITED STATES PATENT OFFICE 2,435,798

AIR CONDITIONING UNIT

Chester J. Rice and Jessie V. Narrell, Pecos, Tex.; said Rice assignor to said Narrell Application September 10, 1947, Serial No. 773,210

3 Claims. (Cl. 183—13)

The present invention relates to an air conditioning unit useful particularly in connection with automobiles or other vehicles where it may be mounted in a window opening and operated during travel of the vehicle.

The primary object of the invention is to provide a simple construction which will be thoroughly reliable in operation and cool the interior of the car to a comfortable temperature.

A further object of the invention is to provide a completely automatic construction which provides for continuous circulation of the coolant, preferably water, whereby the unit will remain effective over considerable periods without requiring that the water supply be replenished.

An additional object of the invention is to provide a unit in which the air circulation through the unit will be forced by the movement of the vehicle, and wherein the water recirculating means will likewise be operated by air pressure obtained through travel of the vehicle.

Another object of the invention is to provide a coolant circulating system operating on the vacuum principle and including a pump which will be continuously operated during the movement of the vehicle.

An equally important object of the invention is to provide a filter means for removing moisture from the cool air before it is introduced to the interior of the vehicle.

A still further object of the invention is to provide automatic means for controlling the passage of air through the unit in accordance with either the speed of the vehicle or the prevailing head wind and the speed of the vehicle.

Also, it is an object of the invention to provide a unit which may be detachably carried in a window opening of the vehicle without modification thereof and without impairing the vision of the driver.

Furthermore, it is an object of the invention to provide means for entirely closing the window area in which the unit is carried.

Another object is to provide a structure which will direct air interiorly of the vehicle at a desired point or points.

An important feature of the invention is the accessibility and detachable mounting of the parts which it may be necessary to repair or replace.

The construction comprises a closed treating chamber having walls of porous water absorbent material through which the air to be conditioned is forced by air pressure created in the travel of the vehicle. The porous walls are maintained constantly wet by liquid supplied thereto. The cooled air from the outlet side of the porous walls is forced through a passageway to a closed chamber which opens into the outlet of the unit. In this passageway is positioned a dry wall of porous water absorbent material, which as distinguished from the wet walls of the treating chamber, is maintained dry to remove residual entrained moisture in the cooled air so that the air delivered to the closed chamber communicating with the outlet into the car is both cooled and dried. Means are preferably provided for controlling automatically the volume of air flowing through the unit in order that, since such air flow is produced by the air pressure incident to travel of the vehicle, maximum cooling and drying efficiency will be maintained notwithstanding variation in prevailing head wind conditions. The coolant such as water is continuously circulated through a system comprising a water receptacle, a pump and headers which supply water to the upper portions of the porous walls of the treating chamber. A reservoir is provided for supplying coolant to the system and this supply is automatically cut off when the pump is inactive.

Referring to the drawings:

Figure 1 is a perspective view of the complete unit,

Figure 2 is a front elevation showing the front wall removed,

Figure 3 is a longitudinal section taken on the line 3—3 of Figure 2,

Figure 4 is a longitudinal section taken on the line 4—4 of Figure 2,

Figure 5 is a detail sectional view taken on the line 5—5 of Figure 4 and also showing an automatic air control, Figure 6 is a detail perspective view of a portion of one of the coolant distributing headers looking at the same from the underside, Figure 7 is a perspective view of the outlet and a modified form of unit positioning means, Figure 8 is a perspective view of a bracket for supporting the unit on a car, Figure 9 is a sectional view of a modified form of invention and taken on the line 9—9 of Figure 10, Figure 10 is a section on the line 10—10 of Figure 9, Figure 11 is a detailed sectional view of the water supply control means used in the modified structures of Figures 9 and 10 and taken on the line 11—11 of Figure 10, and Figure 12 is a detailed sectional view of the extensible wing members shown extending from the outlet of Figure 1 and taken on the line 12—12 of Figure 10.

In Figure 1 the unit is illustrated as a whole at 10 and comprises a housing having curved top and bottom walls 11 and 12 and relatively straight side walls 13. The casing is preferably made from a single band of metal so as to be substantially integral.

At its front the housing is closed by an end wall 14 of metal which may be either welded to the body 10, but is preferably united thereto, as shown, by means of detachable connections such as the screws 15. In this manner, access to the interior of the housing may be readily obtained by removing the end 14. The end wall 14 has an opening and carries a funnel 16 surrounding such opening and a screen 17 to prevent the entrance of dirt and other objects which might be thrown in the path of the unit during the travel of the vehicle. The funnel opening 16 and screen 17 provide the entrance for air under pressure into the unit.

Referring to Figure 3, it will be observed that the funnel 16 directs the incoming air upon the blades 18 of an impeller which is rotatably mounted, at the rear of the funnel, i. e., at the point of highest incoming air pressure, on a suitable shaft 19.

The shaft 19 is suitably mounted on a U-shaped support 20, the latter being detachably secured by bolts to the cover 21 of a bottom chamber or water receptacle 22 defined by the end wall 14 at the front, the adjacent curved bottom 12 of the casing, at the bottom, and the end wall 14' of a reservoir which will be later described. The cover 21 is welded to the adjacent sides of the housing to hold it in position. If desired, a front end wall 14'' preferably integral with the cover 21 may be employed instead of the cover 14 and a similar construction can be used at the other end of receptacle 22.

The shaft 19 is connected to a piston rod 24 carrying a piston member 25 which operates in a cylinder 26 mounted in an opening in the cover 21 and detachably secured therein in any suitable manner. The rotation of the shaft 19 due to the rotation of the impeller from the air pressure when the vehicle is travelling, will operate the piston and draw water from the chamber 22 past the check valve 27 into the cylinder 26 and on the return stroke, deliver the water from the cylinder through the outlet 28 having a check valve therein to the line 29 leading to a pair of headers 30, as best shown in Figure 4. The line 29 has an interposed, flexible detachable connection 31, preferably a rubber hose, whereby the pump mechanism and its part of connection 29 and associated parts may be removed without disturbing the headers and their part of connection 29. This intermediate connection 31, moreover, reduces the vibration between the parts.

Referring to Figure 2, a pair of water absorption pads 32 extend rearwardly from the front end wall 14 to the side wall 14' of a water reservoir 33 located in the rear of the housing. This reservoir is defined by the rear wall 34 of the casing, the adjacent top and bottom walls 11 and 12 thereof and the side wall 14' which is welded to the adjacent wall surface of the casing to form a sealed chamber.

An air treating chamber A is provided which is closed at the sides by the pads 32, at the rear by the wall 14' at the top by a connecting plate 11' for the pads 32, and at the bottom by the cover 21, whereby air which enters the chamber through the screened opening 17 will be forced to travel directly into the chamber A and outwardly through the porous water absorbent walls or pads, as shown by the arrows in Figure 4 as cooled air. At their lower ends, the walls 32 are supported by the cover 21 which has a number of openings 35 therein, disposed below the lower ends 36 of the pads for draining water therefrom to chamber 22. The cover 21 may be provided with pairs of upstanding guide flanges 35' to maintain the lower ends of the pads in position, or the plate 21 may be provided with grooves 36' for this purpose, as shown in Figure 5. Such a construction will allow the pads to be slidably and removably held in the casing.

The pads 32 consist of wire mesh outer layers 37 which enclose and retain the water absorptive material 38 which may be of any well-known variety, preferably excelsior. Between the wire mesh layers and the enclosed layer of excelsior, on each side there is interposed a layer of cloth 39 such as cheesecloth, which acts to distribute the water more evenly on the surfaces of the excelsior. At their upper ends the pads are connected together by a sheet of metal 11' previously described. This metal cover 11' of the treating chamber A has a flange 41 which is detachably secured to the adjacent wire mesh outer layer 37 of the longer pad 42 and has similar flanges 43 which are likewise detachably secured to the wire mesh enclosing layers 37 of the shorter pad, as shown. A suitable bracket 44 has one end welded to the top of the connecting plate 11' and has its other end curved, as shown at 45 to engage the interior curved top wall 11 of the casing whereby to resiliently press the plate 11' and thus the pads 32 downwardly at all times. As will be appreciated, the curved end 45 of the bracket 44 is free. The plate 11' extends from the front wall 14 to the rear wall 14'.

The longer pad 42 is slidably held in position at its upper end by a metal bracket member 46 of U-shape which is welded to the interior wall of the top of the casing as at 47. The pads are thus held as a unit by the connection 11 and may be slidably removed as a unit from the casing by reason of their connection through plate 11' and the slidable mounting means 35' or 36' and 46.

The headers 30 are disposed within the upper ends of the pads 32 and, as shown in Figure 6, are provided on their undersides with spaced openings 48 whereby the water may be distributed to the pads from the line 29. Preferably, these headers are located just below the connecting plate 11' in each of the pads and are enclosed within the excelsior.

When the pump or pads have to be removed, the tubular connection 31 is disconnected from one or the other sections 29 and the pump and fan are removed as a unit and the pads 32 and headers 30 are removed as a unit.

The portion of the long pad 42 extending above the plate 11' provides a dry pad or filter 49 which cooperates with a similar suitably spaced dry pad or filter 50 having its upper end slidably mounted on the housing in the same manner as described in connection with the long pad 42 and having its lower end slidably supported in a suitably U-shaped bracket 51. In this manner the dry pad 50 may be readily removed and replaced as with the other pads. The bracket 51 is welded to the upstanding wall 53, as shown at 54, or may be integral therewith by suitably bending the metal at the upper end of the wall 53. The dry pad 42 extends from the front wall 14 to the rear wall 14' being preferably integral with the pad 32. The dry pad 50 and the wall 53 only extend a longitudinal distance sufficient to comprehend the length of the air outlet 56. This dry pad 50 forms the rear wall together with the wall 53 of a closed chamber B within the casing into which the dry cool air is introduced from pad 50 and from which it is discharged at the outlet 56 into the car. This chamber has a front end wall 57 which extends downwardly from the top of the casing at the front end edge of the dry pad 50 and the front end edge of the wall 53 to the cover 21 and a similar back wall, but preferably the back wall is provided by the reservoir wall 14' as shown in Figure 4. The cover 21 forms the bottom of the chamber B. In this manner, air which passes through the filters 42 and 50 will be introduced to this closed chamber B and confined by it for passage outwardly through the exit 56 only.

The front wall 57 and a separate rear wall, where used, are soldered to the wall 53 or may be integral with the wall 53 and extend at a right angle thereto and to the pad 50 to the adjacent inner surface of the casing where their adjacent edges are soldered to the wall of the casing so as to seal the front and back of chamber B. In the illustration shown in Figure 4, the wall 53 is soldered at its rear edge to the wall 14' and its bottom edge is soldered to the cover 21 so that the rear and bottom walls of chamber B are sealed. The upper edge of the wall 57 will be positioned so close to the front edge of the pad 50 as to make a tight fit without being connected to it so that the pad may be slidably removed and replaced.

The two closed chambers A and B, the former the air treating and cooling chamber and the latter the chamber receiving the cooled dehumidified air are in communication with each other by a passageway or chamber C. That is, the cooled air passes from chamber A outwardly through the porous walls 32 into the passages C and it will be noted that a dry wall is provided for each porous outlet side of treating chamber A.

The outlet 56 is rectangular and suitably welded to the side wall of the casing, as shown at 58 and includes a plurality of movable vanes 59 disposed, as shown in Figures 1 and 7. The top of the outlet is preferably struck out from the wall 13 of the casing while the bottom and end walls are formed of a single piece of metal and welded to the top and body wall 13. In Figure 1 the outlet 56 is shown as provided with a tongue 60 formed in its top to engage in the upper window channel of the door and with a plate 61 welded to the bottom of the outlet and to the outer wall of the housing, as shown in Figure 2 and having a groove 61' to receive the glass of the window whereby when the glass is rolled up the unit will be clamped in position. At one end of the outlet 56 there is provided a hinged member 62 which is connected to the outlet by a frictional type of hinge 63 in order to direct a part of the air from the outlet upon an adjacent area of the car. By reason of the frictional hinge, the flap 62 may be adjusted to direct the air as desired.

At one end the outlet, as shown in Figures 1, 10 and 12, is provided with a grooved member 64 in which slides a plate 65 to close the opening between the wall of the window and the outlet 56 when the unit is installed on the vehicle. The member 64 has grooves on its opposite longitudinal edges within which the plate 65 is extensible. The member 64 has a right angle flange 64' by which it is screwed or bolted to the adjacent end wall of the outlet. A similar wing or extensible plate is provided on the other side of the outlet, the plate 65, in this instance, having a curved upper edge to accommodate the curvature of the wall of the window opening, as shown at 65' in Figure 1.

Referring to Figures 4 and 5, there are instances when the air pressure is excessive due to the speed of the vehicle or the prevailing head wind plus the speed of the vehicle. In such cases, it is desired to control the introduction and discharge of air in the unit and for this purpose we provide an air control shown in detail in Figure 5. This device consists of a circular concave member or plate 66 having its concave portion facing the funnel 16 and disposed in the space between the pads 32.

The member 66 is rigidly mounted on a sleeve 67 which, in turn, is mounted for rotary movement on a shaft 68 positioned within the sleeve and supported in a fixed position by a bracket 68' attached to the bottom 21. The concave cup 66 is normally held in the position shown in Figure 4 by means of the spring 69 connected to the sleeve 67 and to an adjustable connection 70 supported by a bracket 71 mounted on the bottom 21. The adjustable connection may be a threaded member which may be adjusted in the bracket 71, as shown, to make it operate at any desired predetermined air pressure. Fixed to the sleeve is an arm 72 which is pivotally connected to an arm 73 carrying a shutter member 74 which is pivotally mounted at 75 at the junction of outlet 56 with the housing. This shutter member normally occupies the position shown in Figure 5 to allow free egress of air through the outlet 56, but when the air pressure exceeds the predetermined amount, the concave plate 66 is moved rearwardly which rotates the sleeve 67 and draws the arm 72 rearwardly to thereby pull the arm 73 and move the shutter 74 to the dotted line position, shown in Figure 5, to reduce the opening from the chamber B leading to the outlet 56. The concave plate 66 is relatively small as compared to the total transverse area of the space between the pads 32 and its presence does not affect the operation of the unit except as indicated to control the volume of air being forced through the unit by movement of the vehicle.

The water reservoir 33 is disposed in the rear of the casing and has an opening 76 which is completely sealed by a cap 77. The reservoir 33 is formed by securing or soldering the disc or wall 14' at its periphery to the interior surface of the housing to provide a closed chamber. Leading from the reservoir 33 is a pipe 78 which supplies water to the water receptacle 22 at the bottom of the unit through the outlet 79. This outlet 79 is always immersed in the liquid in the chamber 22 unless for some reason the liquid level of the chamber 22 drops below the outlet of the opening 79; then additional water will automatically be delivered from the reservoir 33 through the pipe 78 to the chamber 22 in accordance with the well-known vacuum principle. This is an important feature of the invention since it operates in connection with the impeller 17 and the pump to provide a completely automatically operable unit for circulating the cooling liquid.

Referring to Figure 7, there is illustrated a modified form of construction for positioning the unit in a window opening wherein a U-shaped member 80 is positioned at the outlet instead of the tongue 60. This U-shaped member will receive the entire top edge of the window casing to hold the unit in place. Instead of a groove 61, a flange 81 is provided which will be disposed on the interior of the window glass at the upper edge thereof.

The unit may be supported by a suitable extensible bracket 82 secured to the casing at 82' extending downwardly from the side wall of the casing opposite the outlet 56, and inclined inwardly with its lower end disposed in the outside space between the glass and the door and having a rubber cover 83. In this manner, the unit will be supported in proper position while the flange 81 and U-shaped member 80 will hold the unit always against lateral movement. The flange 81 allows for levelling of the unit on the glass which is of decided advantage to assure best operation.

Referring to Figure 9 there is illustrated a modified form of the invention in which the water reservoir 100 is disposed in the top of the casing and liquid is pumped thereto from the receptacle 22 through the line 29a having a flexible connection 31a. The reservoir is sealed by the closure 101 and has an outlet 102 which communicates with a container 103 having a cover provided with vent openings 104. Leading from the container 103 are a pair of headers 105 for supplying water or coolant to the pads 32, as shown in Figure 11. The construction is otherwise similar to that previously described and operates on a similar vacuum principle. That is, the outlets 105' from the container to the headers 105 will be disposed below the water level in the container 103 during operation of the pump and the outlet end 102' of pipe 102 will always be below the water level in the container. When the pump is inactive, the liquid level in the container falls below the container outlets to the headers 105 and fluid will no longer pass from the reservoir 100 into the container 103 due to the operation of the vacuum principle.

As in the preferred construction, when the vehicle stops, pumping from the receptacle will be discontinued but since the pipe 102 is always below the water level in the container 103 there will be no leakage from the tank reservoir 100 such as would overflow the chamber 22. That is, since the reservoir is a sealed unit while the pump is inoperative, the flow from the reservoir is automatically cut off when the pump is inactive as in the preferred form of the invention where flow from the reservoir 33 in the line 78 is automatically cut off when the pump is discontinued because the respective outlets 78' and 102' from the reservoirs, under such circumstances, are immersed in the coolant.

The end 34 may be welded to the housing but preferably is detachably connected as by screws 110. A gasket 111 is also employed to assure a tight seal for the reservoir 33.

The plate 21, aside from the features abovementioned, also prevents sloshing over of water in the water receptacle due to movement of the vehicle, while the automatic cut-off from the reservoir eliminates the possibility of the receptacle or the unit being flooded during operation of the unit. The tank 100 may be secured to the top of the casing in a suitable manner, as by welding at the adjacent edges 106.

As will be appreciated, the invention is particularly useful in connection with automobiles and trucks and may also be used upon other mobile vehicles, such as railway rolling stock, aircraft and boats. The unit is installed in such a manner that the funnel is open in the direction of movement of the car or mobile vehicle and the air pressure will be sufficient to operate the fan for driving the pump as well as for forcing the air through the unit to the outlet. While the unit is shown as designed for installation in a side window opening, it may be installed in any convenient position such as the top of the vehicle or motor car, i. e., in any position where the air pressure created by movement of the carrier will operate the pump or water recirculating means and also force the air through the conditioning unit.

We claim:

1. An air cooling and humidifying unit comprising a closed housing having an entrance for air under pressure, a closed air treating chamber within said housing, said chamber having an opening facing said entrance for directly receiving air from said entrance, said chamber having longitudinally extending side walls of porous, liquid absorbent material through which said air will pass, a liquid pump, a reservoir for supplying liquid to said pump, said pump supplying liquid to said absorbent walls, a fan adjacent said entrance and rotated by the air pressure and driving said pump, the absorbent walls of said chamber being spaced from the adjacent side walls of the housing to thereby define a passageway for air passing from said chamber through said absorbent walls, said passageway communicating with an outlet for the housing, and a wall of dry, porous liquid absorbent material disposed in the passageway through which all of the air passing from said porous side walls will pass, and means for automatically cutting off the flow of liquid from the reservoir when the pump is inactive.

2. An air cooling unit according to claim 1 having means disposed in said chamber and operated by the air pressure for automatically controlling the volume of air passing through said chamber.

3. An air cooling unit according to claim 1 having a liquid receptacle positioned in the bottom of the housing, the said reservoir being sealed except for a pipe establishing communication between the reservoir and said receptacle, said pump pumping water from said receptacle to said liquid absorbent walls of said chamber, one end of said pipe extending into said receptacle and providing a seal for cutting off supply of liquid from said reservoir to said receptacle when the liquid level in the receptacle covers the said end of said pipe.

CHESTER J. RICE.
JESSIE V. NARRELL.

REFERENCES CITED

The following references are of record in the file of this patent:

UNITED STATES PATENTS

| Number | Name | Date |
|---|---|---|
| 2,112,041 | Miller | Mar. 22, 1938 |
| 2,189,391 | Bowdish | Feb. 6, 1940 |
| 2,230,020 | Webster | Jan. 21, 1941 |
| 2,237,497 | Munford | Apr. 8, 1941 |
| 2,361,076 | Agee, Jr. | Oct. 24, 1944 |